Aug. 18, 1942.  E. L. LOREHN ET AL  2,293,153
COMPOSITE BODY VALVE RAM
Filed Dec. 27, 1937  2 Sheets-Sheet 2
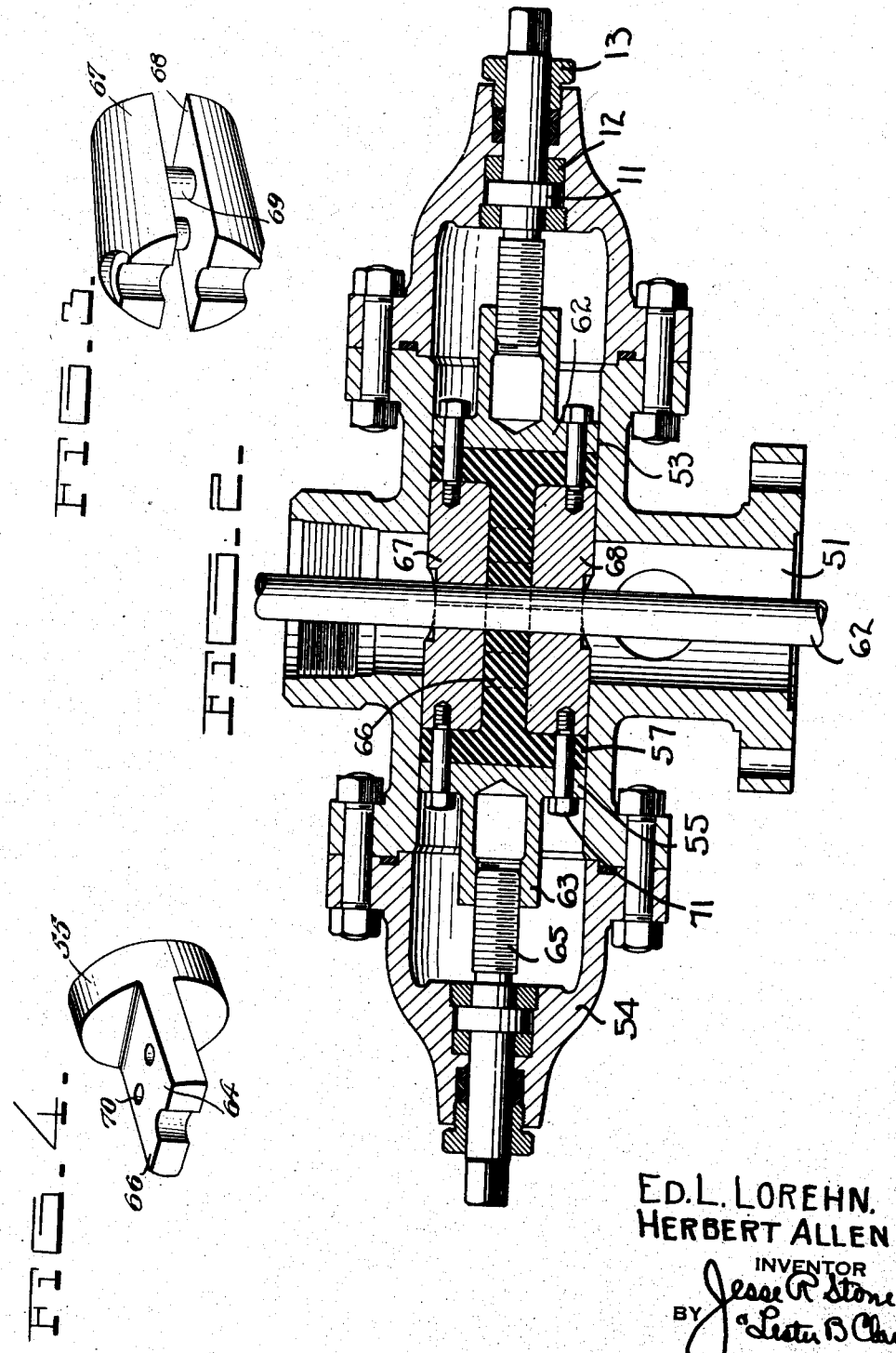
ED. L. LOREHN.
HERBERT ALLEN
INVENTOR
BY Jesse R Stone
Lester B Clark
ATTORNEYS Patented Aug. 18, 1942

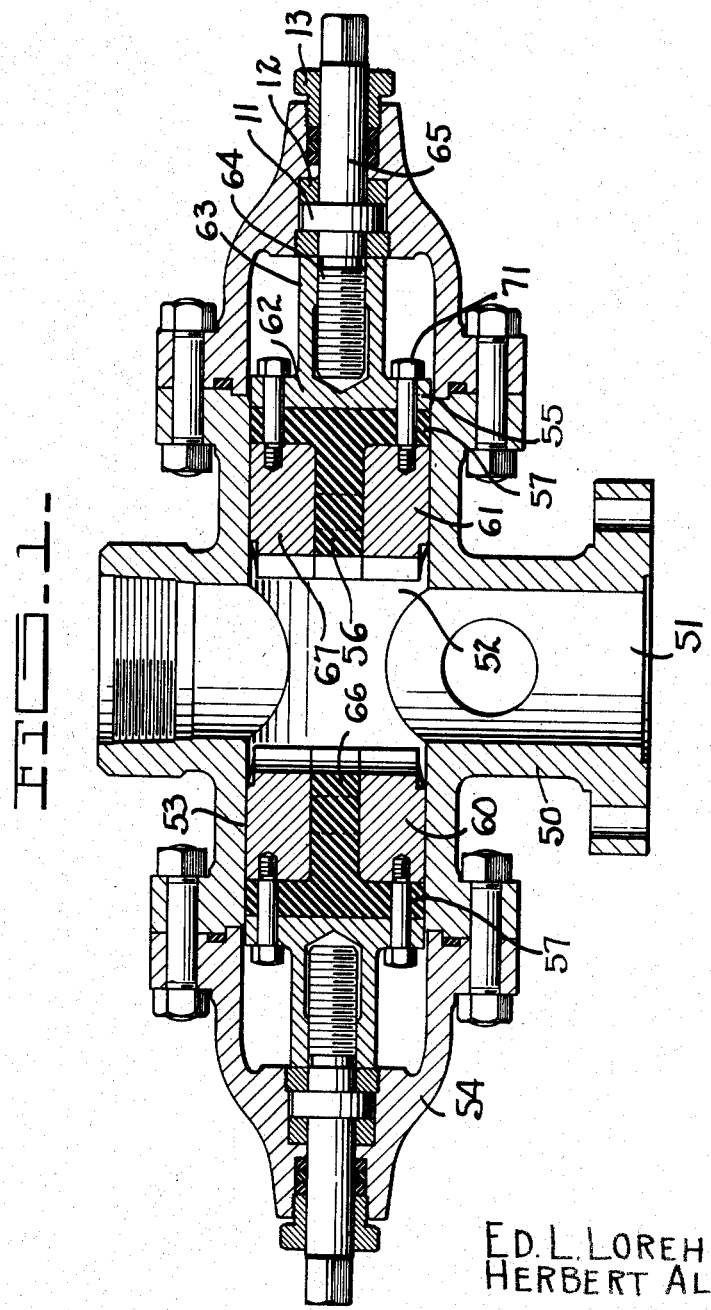

2,293,153

UNITED STATES PATENT OFFICE 2,293,153

COMPOSITE BODY VALVE RAM

Edmond L. Lorehn and Herbert Allen, Houston, Tex., assignors to Cameron Iron Works, a corporation Application December 27, 1937, Serial No. 181,831

4 Claims. (Cl. 251—159)

The invention relates to a valve or blowout preventer construction and particularly to the rams thereof which moves across the passage to effect closing thereof.

It is one of the objects of the invention to provide a composite structure for valve members or rams which are made of resilient packing and metal supporting or reenforcing members therefor which can be assembled together so that a pressure applied to the front face of the ram will be equalized throughout the resilient portion of the packing to effect a seal around the edges of the valve member or ram.

Still another object of the invention is to provide a composite metal body which is arranged to receive a resilient packing member in order to form a valve member or blowout preventer.

Another object of the invention is to provide a composite sealing member for valves and blowout preventers wherein the resilient material of a packing is confined and subjected to the pressure causing the closing of the member so that pressure will be applied to the packing to effect a seal.

Still another object of the invention is to provide a valve or ram member made up of reenforcing members, a resilient packing and a cap member by which the thrust is applied to the other parts of the member.

Certain of the subject matter originally disclosed herein relating to a valve construction has been divided and is embodied in a divisional application, Serial No. 417,860, filed November 4, 1941.

Other and further objects of the invention will be readily apparent when the following description is considered in connection with the accompanying drawings wherein:

Figs. 1 and 2 are vertical sectional views of a blowout preventer construction to which the invention has been applied, Fig. 1 showing the preventer open and Fig. 2 showing it closed.

Fig. 3 shows the metallic construction of a ram member.

Fig. 4 shows a resilient packing member to be utilized with the body of Fig. 3.

The bonnet 54 carries a spindle 65 which is rotatably mounted in the body by means of a collar 11 on the spindle which is confined between the thrust rings 12. A stuffing box 13 tends to close the bonnet and this stem is of the non-rising type in that it is provided with the threads 64 which engage with similar threads on the inside of the stem 63 carried by the cap 62.

Figs. 1 and 2 show that the parts are constructed in a compact form because there are two cooperating ram members 60 and 61 which are arranged to close about a pipe 62 which may be passing through the blowout preventer. In some instances there is no pipe 62 present in the preventer and under these circumstances a flat front face will be provided on the rams instead of a recessed face to fit about the pipe.

The application of the invention to a blowout preventer as seen in Figs. 1 and 2 wherein the housing 50 has a vertical passage 51 therethrough which is enlarged at 52 to allow transverse movement of the ram constructions. The housing extends laterally from the central passage and has the cylindrical chambers 53 thereon which are closed at the outer ends by the bonnets 54.

In Figs. 1 and 2 the rams are of a construction such that the cap 62 has the stem 63 extending rearwardly thereon, which stem is threaded at 64 to receive the spindle 65. This spindle is rotatably mounted as described above.

The cap 62 has a head 55 which serves as a base or backing for the packing member 56. This packing is seen in perspective view in Fig. 4 and is arranged with a cylindrical head 57 which has a tongue 66 projecting laterally from one side thereof. This tongue has flat upper and lower faces in order to receive complementary faces on the upper retainer plate 67 and the lower retainer plate 68. This plate construction is shown in Fig. 3 with the plates 67 and 68 held in assembled position by means of the cross pins 69.

The tongue 66 fits between the two plates and has openings 70 therein to receive these cross pins 69. A plurality of bolts 71 are arranged to pass through the head 55 of the cap in order to retain the top and bottom plates in position. It should be noted, however, that these bolts are slidable in the head 55 so that the plates 67 and 68 may have relative sliding movement with respect to the head.

With the parts assembled as seen in Fig. 1 it seems obvious that the plates 67 and 68 are supported wholly by the tongue 66 of the packing. The forward faces of the plates and the tongue are in substantial alignment and as the rams move forwardly they will encircle the pipe 62. All of the pressure is imparted to the packing and the plates by the head 55, and, of course, when the plates abut against the pipe 62 they are prevented from further movement so that any pressure applied to the ram by the head 62 will be transmitted through the packing so that such pressure will tend to expand the head 57 of the packing against the cylindrical portion of the preventer housing. This pressure will also be transmitted through the tongue 66, tending to spread the top and bottom plates apart and to force the resilient material about the pipe 62 and against the housing to form a complete seal.

In other words, the entire packing is confined by the plates and the cap in conjunction with the preventer housing so that any desired unit pressure can be applied to the packing. In event there is wear on the faces of the packing the cap 62 may have relative movement inasmuch as it may slide along the bolts 61 while the plates are held stationary against the pipe. This compensating movement tends to extrude the packing material forwardly between the plates to compensate for wear and insure the forming of a perfect seal.

Broadly the invention contemplates a valve or ram construction wherein the forward portions of the ram are floating upon the packing material and serve the dual purpose of confining the packing material and serving as a portion of the valve or ram member.

What is claimed is:

1. A blowout preventer including a housing, a passage to be closed, a pair of ram members to close said passage, each ram member comprising a cap, a spindle sleeve thereon, a packing abutting said cap and extending forwardly therefrom, and retainer plates fitted to float on the top and bottom of said packing and against said housing to confine the packing when said plates of opposite rams abut each other, said plates being slidably connected to said cap, a portion of said packing being disposed between the rear ends of said plates and said cap so that as said cap advances relative to said plates said packing will be forced between said plates.

2. A blowout preventer including a housing, a passage to be closed, a pair of ram members to close said passage, each ram member comprising a cap, a spindle sleeve thereon, a packing abutting said cap and extending forwardly therefrom, and retainer plates fitted to float on the top and bottom of said packing and against said housing to confine the packing when said plates of opposite rams abut each other, said plates being slidably connected to said cap, a portion of said packing being disposed between the rear ends of said plates and said cap so that as said cap advances relative to said plates said packing will be forced between said plates, and cross pins extending through said packing to connect said plates.

3. A packing member for valve or preventer rams comprising solid circular base portion, and a tongue piece extending transversely therefrom along a diameter.

4. A circular packing confining assembly for valve or preventer members comprising a pair of plate members, cross pins connecting said members and holding them in spaced relation, the outer surfaces of said plates being curved on the arc of a circle, a packing having a tongue to be received in said space, and an annular base portion of the diameter of said assembly, and a cap member to apply pressure to the packing to force the packing forwardly in said space to sealing position.

HERBERT ALLEN.
EDMOND L. LOREHN.